(12) United States Patent
Huang

(10) Patent No.: US 11,490,724 B2
(45) Date of Patent: Nov. 8, 2022

(54) ELECTRIC PET HAIR BRUSH

(71) Applicant: Shenzhen zhongdaxin Epoxy plate Co. Ltd., Shenzhen (CN)

(72) Inventor: Shengwen Huang, Anxiang (CN)

( * ) Notice: Subject to any disclaimer, the term of this patent is extended or adjusted under 35 U.S.C. 154(b) by 365 days.

(21) Appl. No.: 16/872,405

(22) Filed: May 12, 2020

(65) Prior Publication Data

US 2020/0329856 A1 Oct. 22, 2020

(30) Foreign Application Priority Data

Apr. 18, 2020 (CN) .......................... 202010308641.9

(51) Int. Cl.
*A46B 13/02* (2006.01)
*A01K 13/00* (2006.01)
*A46B 9/02* (2006.01)
*A46B 13/00* (2006.01)
*A46B 15/00* (2006.01)

(52) U.S. Cl.
CPC .............. *A46B 13/02* (2013.01); *A01K 13/00* (2013.01); *A46B 9/023* (2013.01); *A46B 13/005* (2013.01); *A46B 15/0004* (2013.01); *A46B 2200/1093* (2013.01)

(58) Field of Classification Search
CPC ........ A46B 9/023; A46B 13/02; A46B 13/005; A46B 15/0004; A46B 2200/1093; A01K 13/00; A01K 13/001; A45D 24/32
See application file for complete search history.

(56) References Cited

U.S. PATENT DOCUMENTS

| 2,660,183 | A | * | 11/1953 | Gruring | ................. | A47K 11/10 132/121 |
| 9,010,276 | B1 | * | 4/2015 | Nevitt | .................... | A45D 24/32 119/625 |
| 10,098,322 | B2 | * | 10/2018 | Ferrentino | ............. | B26B 19/44 |
| 2007/0169720 | A1 | * | 7/2007 | Roy | ......................... | A46B 7/10 119/615 |
| 2015/0342333 | A1 | * | 12/2015 | Park | ....................... | A46B 9/023 15/23 |
| 2019/0124885 | A1 | * | 5/2019 | Pereira | ................... | A46B 7/044 |

* cited by examiner

*Primary Examiner* — Randall E Chin

(57) ABSTRACT

The present invention discloses an electric pet hair brush. The electric pet hair brush. comprises a shell, a roller, a control module and a power module. The shell has an accommodation space. The control module and the power module are electrically connected and are accommodated in the accommodation space. The roller is arranged at the front end of the shelf and is connected with the power module. The roller can be driven by the power module to rotate. The roller comprises a roller main body and multiple comb assemblies. The power module drives the roller main body to rotate, and the multiple comb assemblies can alternatively and circularly extend from the roller main body or retract into an accommodation space of the roller main body with the rotation of the roller main body.

18 Claims, 9 Drawing Sheets

ELECTRIC PET HAIR BRUSH

TECHNICAL FIELD

The present invention relates to the technical field of pet hair brushes, and in particular to an electric pet hair brush.

BACKGROUND

The existing pet hair brush is generally manually operated to cause large workload. Additionally, pet hairs removed by such brush are easy to scatter around and hard to be collected so as to influence the living hygiene. Moreover, the pet hairs are easy to breed bacteria, but the existing electric pet hair brash does not generally have the sterilization function, resulting in influencing the people's health.

Therefore, it is necessary to provide an electric pet hair brush capable of automatically brushing the hair and having the sterilization function.

SUMMARY

An objective of the present invention is to provide an electric pet hair brush in order to solve the problems in the background art.

To achieve the objective, the present invention provides a technical solution as follows:

An electric pet hair brush comprises a shell, a roller, a control module and a power module. The shell has an accommodation space. The control module and the power module are electrically connected and are accommodated in the accommodation space. The roller is arranged at the front end of the shell and is connected with the power module. The roller can be driven by the power module to rotate. The roller comprises a roller main body and multiple comb assemblies. The power module drives the roller main body to rotate, and the multiple comb assemblies can alternatively and circularly extend from the roller main body or retract into an accommodation space of the roller main body with the rotation of the roller main body.

Preferably, the roller main body has multiple comb through holes. The multiple comb through holes are respectively in one-to-one correspondence with the multiple comb assemblies. Teeth of the multiple comb assemblies can extend from the roller main body through the corresponding comb through holes. The teeth of the multiple comb assemblies can also retract into the accommodation space of the roller main body along the corresponding comb through holes.

Preferably, the roller further comprises a baffle unit. The baffle unit comprises a first baffle and a second baffle. The first baffle and the second baffle are respectively arranged at two ends of the roller main body and are connected with the roller main body to form the accommodation space of the roller main body. The baffle unit and the roller main body are assembled to form a housing of the roller.

Preferably, the first baffle comprises a first baffle main body and a driving wheel. The first baffle main body and the driving wheel are fixedly connected and are coaxially arranged. The power module is connected with the driving wheel through a driving belt to drive the housing of the roller to rotate.

Preferably, the comb assembly comprises a comb main body and reset springs. The comb main body comprises a comb body, multiple teeth arranged on the comb body and comb limiting parts arranged at two ends of the comb body. The reset springs sleeve the middle portions of the multiple teeth. When the teeth pass through the corresponding comb through holes, the reset springs abut against an inner surface of the roller main body and are compressed so as to be capable of providing a pushing force for the comb main body.

Preferably, each of the first baffle and the second baffle has a central hole and limiting slots. The multiple limiting slots are distributed around the central hole and extend in a radial direction of the first baffle and the second baffle. The multiple limiting slots correspond to the comb main bodies. The comb limiting parts at the two ends of the comb body are respectively arranged in the limiting slots of the first baffle and the second baffle. The comb main body can do reciprocating movement in extension directions of the limiting slots.

Preferably, the electric pet hair brush further comprises an eccentric wheel unit. The eccentric wheel unit comprises a first eccentric wheel and a second eccentric wheel. One end of the first eccentric wheel and one end of the second eccentric wheel are respectively connected with the central hole of the first baffle and the central hole of the second baffle; the other ends are connected with the shell. An eccentric wheel of the first eccentric wheel and an eccentric wheel of the second eccentric wheel are arranged in the accommodation space formed by the roller main body and the baffle unit, are oppositely arranged and deviate from the circle centers of the central holes. The eccentric wheel of the first eccentric wheel and the eccentric wheel of the second eccentric wheel are static corresponding to the shell.

Preferably, the electric pet hair brush further comprises an air duct and a vacuum cleaner. The air duct is accommodated in the shell. One end of the air duct is close to the roller, and the other end thereof is communicated with the vacuum cleaner.

Preferably, the electric pet hair brush further comprises a power supply module. The power supply module is electrically connected with the control module.

Preferably, the electric pet hair brush further comprises an ultraviolet lamp module. The ultraviolet lamp module is electrically connected with the control module and is arranged at the bottom of the shell.

The electric pet hair brush provided by the present invention can comb hairs of the pet in an electric roller manner. Moreover, the electric pet hair brush can collect the removed hairs of the pet during rotation, thereby reducing the workload of the pet host. Additionally, the electric pet hair brush provided by the present invention can further sterilize the pet hairs by using the ultraviolet lamp during combing so as to ensure the pet's health.

DESCRIPTION OF THE EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall within the protection scope of the present invention.

Figure 1:
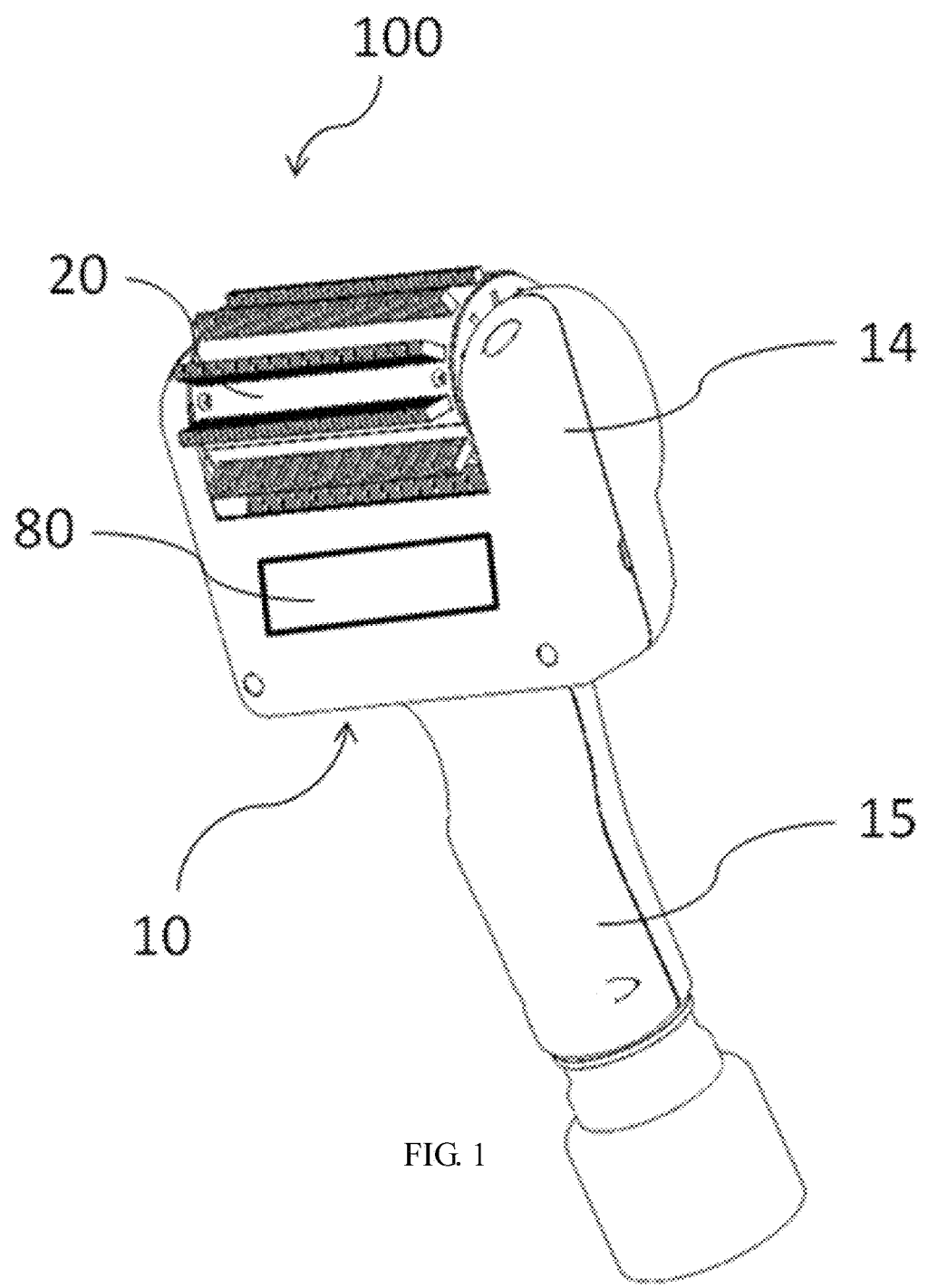
FIG. 1 is a schematic structural diagram of an electric pet hair brush provided by the present invention.
Figure 2:
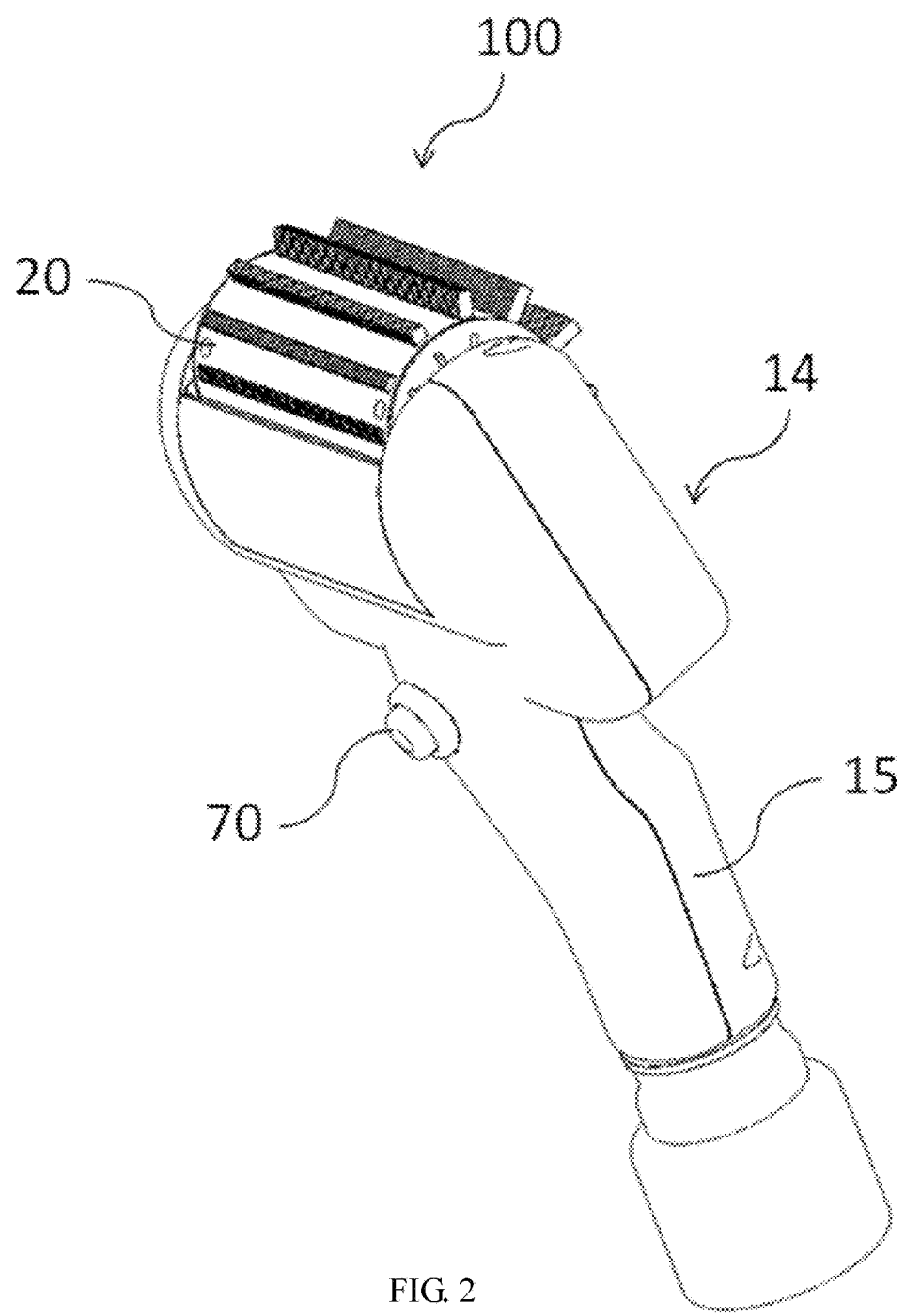
FIG. 2 is another perspective view of the electric pet hair brush shown in FIG. 1.
Figure 3:
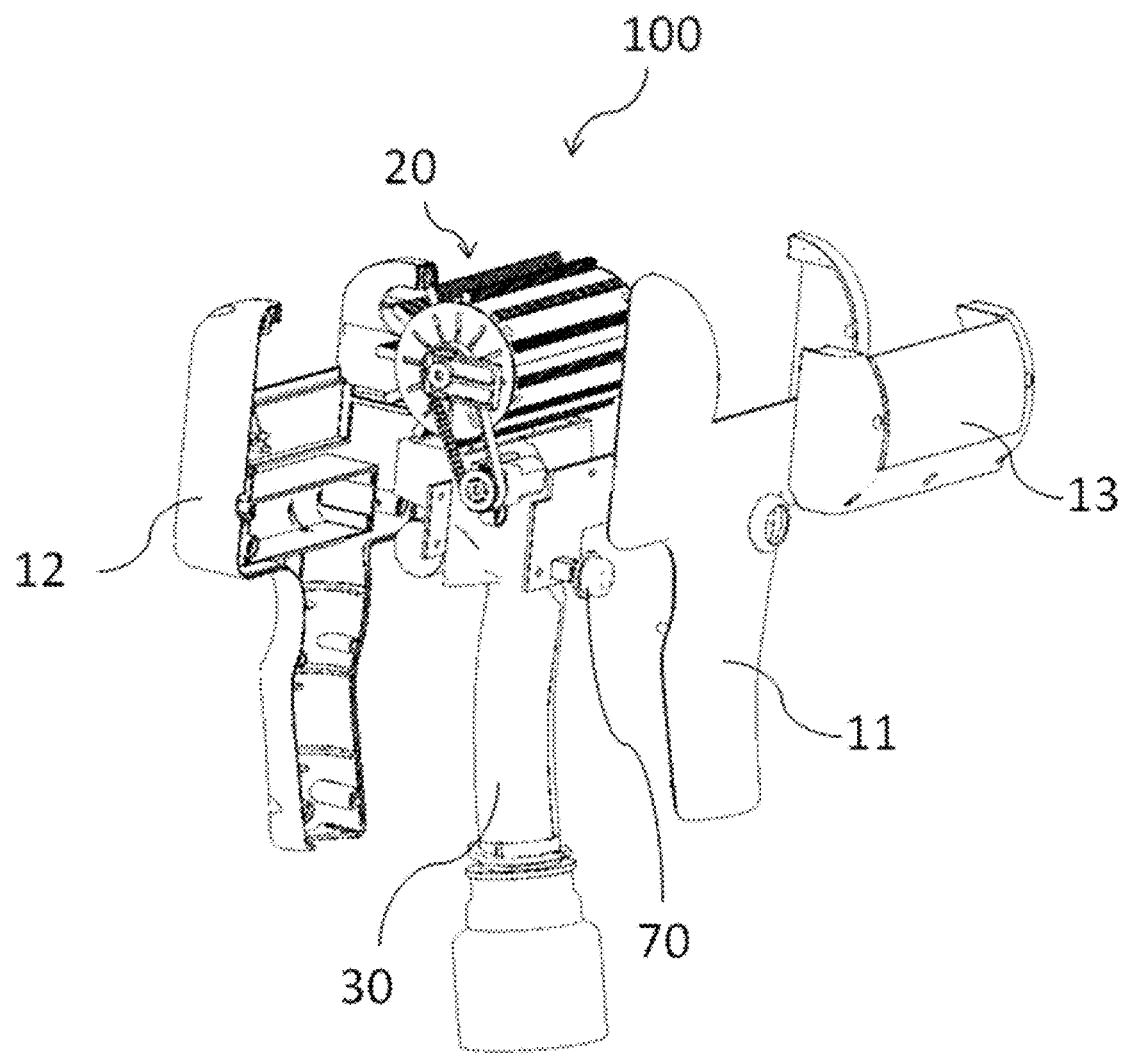
FIG. 3 is an exploded view of the electric pet hair brush shown in FIG. 1.
Figure 4:
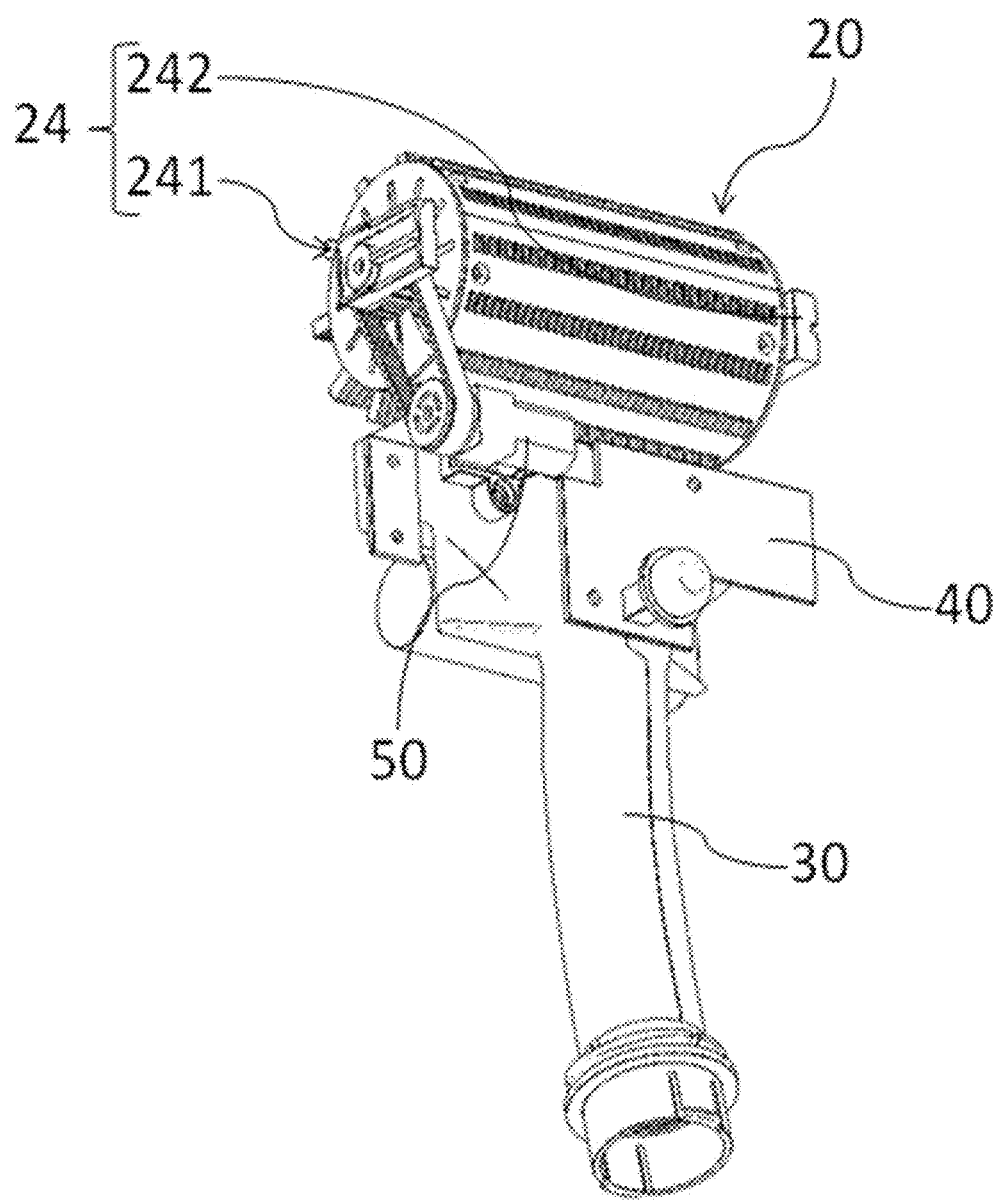
FIG. 4 is a schematic structural diagram of the electric pet hair brush shown in FIG. 1 after a shell is removed.
Figure 5:
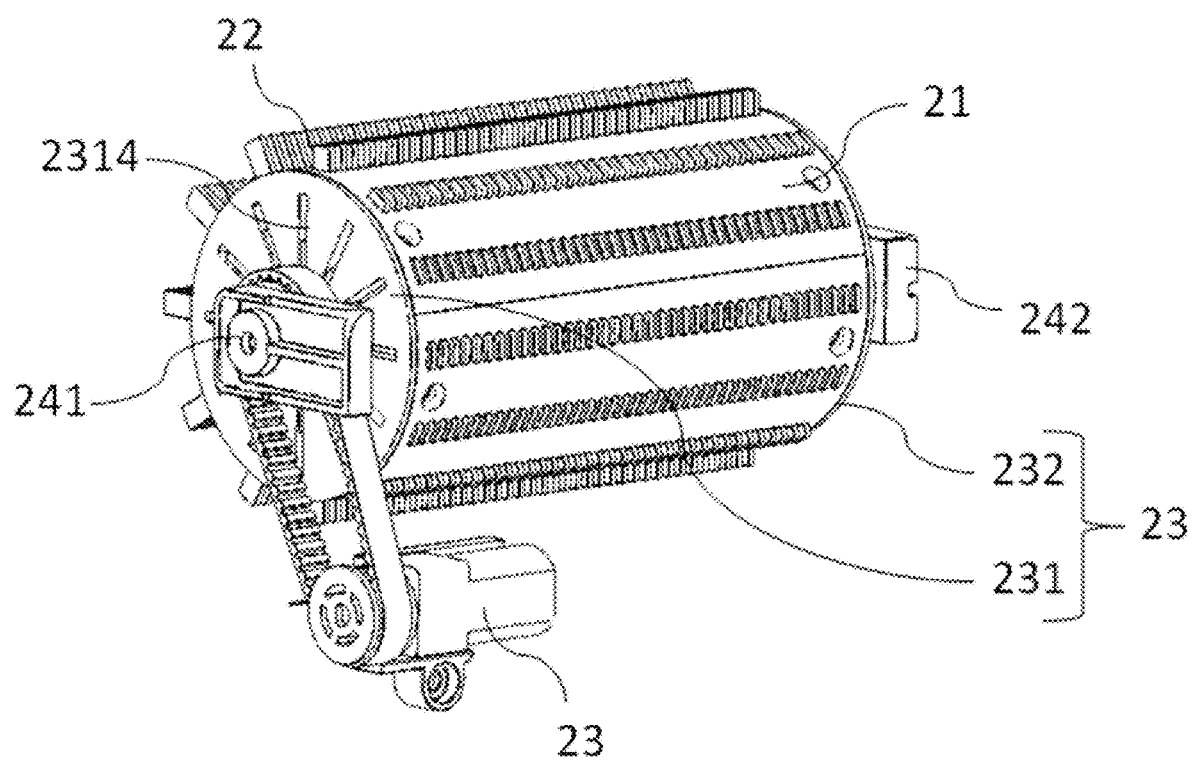
FIG. 5 is a schematic diagram showing a connection structure of a roller and a power module of the electric pet hair brush shown in FIG. 1.
Figure 6:
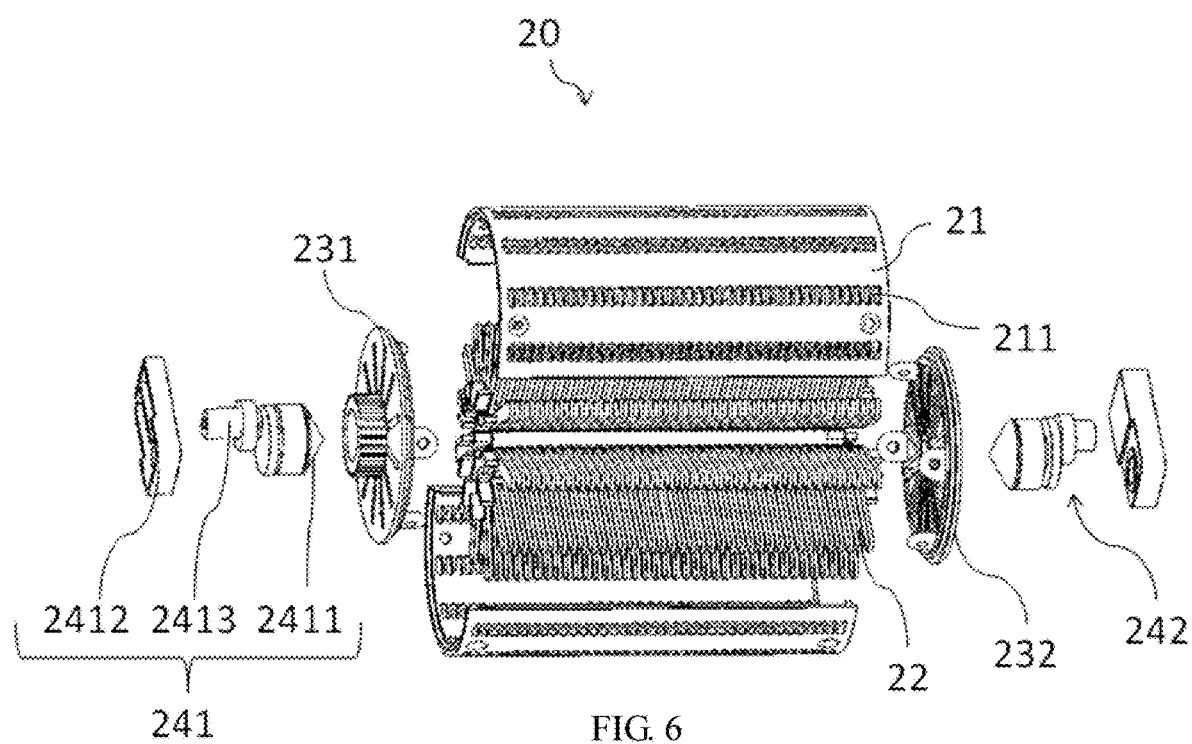
FIG. 6 is an exploded view of a roller of the electric pet hair brush shown in FIG. 1.
Figure 7:
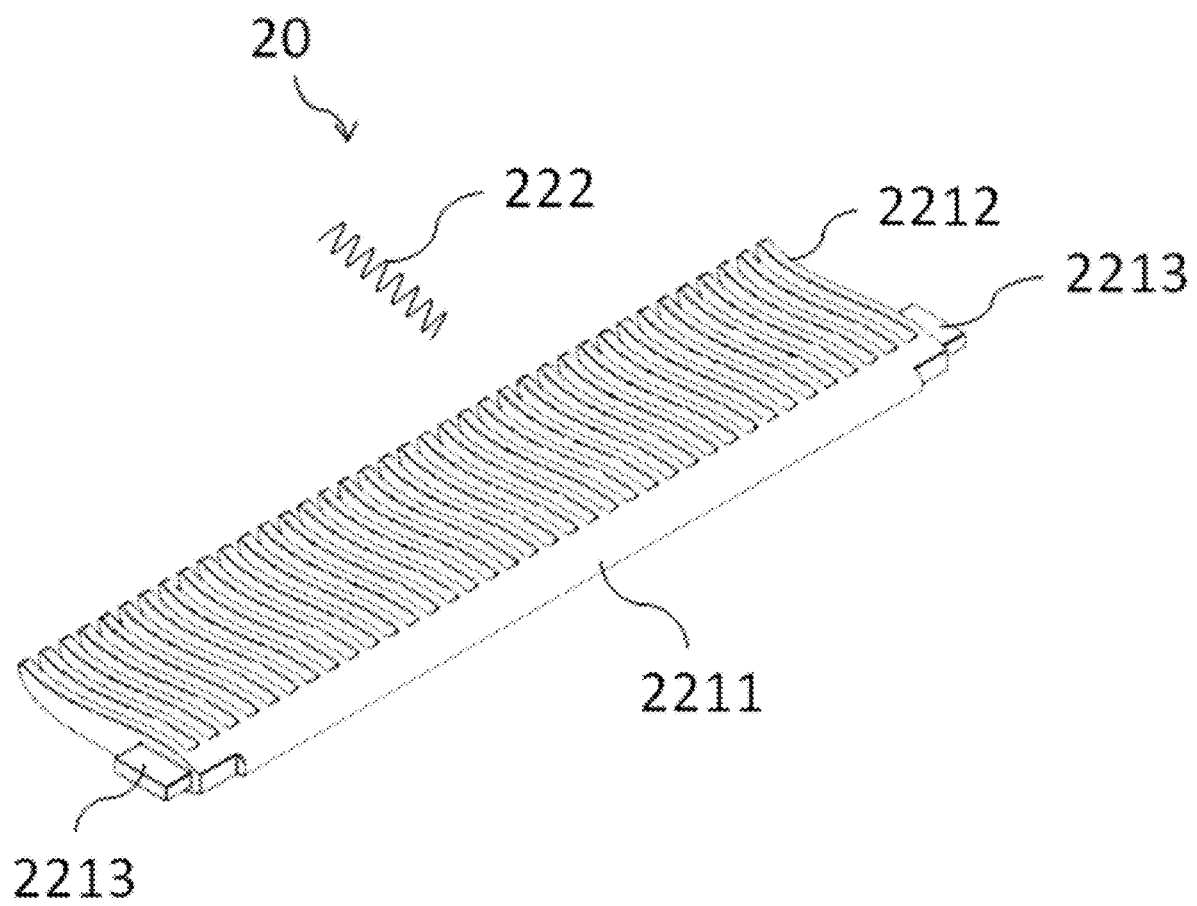
FIG. 7 is an exploded view of a comb assembly in the roller shown in FIG. 6.
Figure 8:
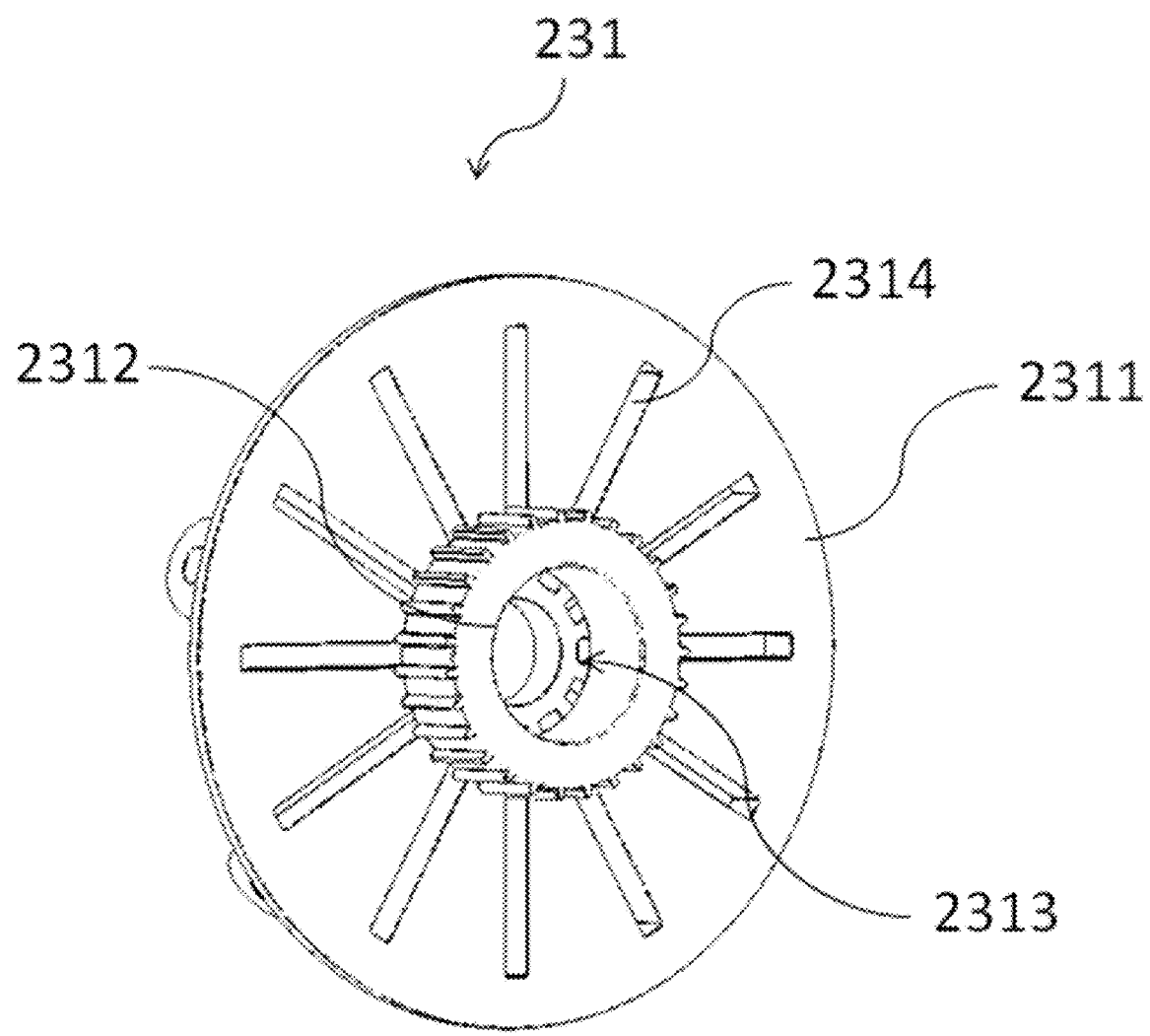
FIG. 8 is a schematic structural diagram of a first baffle in the roller shown in FIG. 6.

Referring to FIG. 1 to FIG. 4, FIG. 1 is a schematic structural diagram of an electric pet hair brush provided by the present invention. FIG. 2 is another perspective view of the electric pet hair brush shown in FIG. 1. FIG. 3 is an exploded view of the electric pet hair brush shown in FIG. 1. FIG. 4 is a schematic structural diagram of the electric pet hair brush shown in FIG. 1 after a shell is removed.

The electric pet hair brush 100 comprises a shell 100 a roller 20, an air duct 30, a control module 40, a power module 50, a power supply module 60, a switch module 70, an ultraviolet lamp module 80 and a vacuum cleaner (which is not shown in the drawings). There is an accommodation space in the shell 10. The roller 20 is arranged at the front end of the shell 10. The air duct 30, the control module 40, the power module 50 and the power supply module 60 are accommodated in the accommodation space of the shell. The switch module 70 is accommodated in the accommodation space of the shell. The control module 40 is respectively electrically connected with the power module 50, the power supply module 60 and the switch module 70.

A lower shell 11, an upper shell 12 and a front cover plate 13 are assembled to form the shell 10. The formed shell 10 comprises an accommodation cavity 14 and a handle 15.

Referring to FIG. 4 to FIG. 8, the roller 20 is arranged at the front end of the shell 10. Specifically, the roller 20 is connected with the front end of the accommodation cavity 14. The roller 20 can rotate around the axial direction of a connection part of the roller and the accommodation cavity 14. The roller 20 comprises a roller main body 21, comb assemblies 22, a baffle unit 23 and an eccentric wheel unit 24. The roller main body 21 and the baffle unit 23 are assembled to form an accommodation space. The comb assemblies 22 and the eccentric wheel unit 24 are partially accommodated in the accommodation space.

The roller main body 21 has a hollow cylindrical structure. In the embodiment, the roller main body 21 has multiple comb through holes 211 distributed in the length direction of the cylinder. Each comb through bole 211 comprises multiple through holes. The through holes are linearly arranged. The multiple comb through holes 211 are in one-to-one correspondence with the multiple comb assemblies 22. Further, the tail end of the comb assembly 22 can pass through the through hole 211. Moreover, in the embodiment, the roller main body 21 is formed by two arc housing bodies in an assembly manner.

Referring to FIG. 7 again, there are multiple comb assemblies 22, and each comb assembly 22 comprises a comb main body 221 and reset springs 222. The reset springs 222 sleeves teeth.

The comb main body 221 comprises a comb body 2211, multiple teeth 2212 and comb limiting parts 2213 arranged at two ends of the comb body 2211. The multiple teeth 2212 are arranged at the top end of the comb body 2211 in parallel at intervals. In the embodiment, the space between two adjacent teeth 2212 and the length of the tooth 2212 can be correspondingly adjusted according to different pets, which is not limited herein. Further, the top ends of the multiple teeth 2212 are bent towards the same direction, and the curvature can be adjusted according to the actual requirements. Additionally, the bending direction of each tooth 2212 is the same as the rotation direction of the roller 20 so as to achieve a better hair combing effect.

The comb limiting parts 2213 are arranged at two ends of the comb body 2211. The comb limiting parts 2213 are used for limiting the movement path of the corresponding comb assembly 22.

The reset spring 222 sleeves one tooth 2212 of the middle portion of the comb main body 221. The reset spring 222 can provide a reset force for the comb main body 221 such that the comb main body 221 can retract into the roller main body 21.

The baffle unit 23 comprises a first baffle 231 and a second baffle 232. The first baffle 231 and the second baffle 232 are respectively arranged at two ends of the roller main body 21. The baffle unit 23 and the roller main body 21 are assembled to form the housing of the roller 20. The housing has a closed internal space at this time. further, the baffle unit 23 and the roller main body 21 form a closed cylindrical space.

Referring to FIG. 8 again, the first baffle 231 comprises a first baffle main body 2311 and a driving wheel 2312. The first baffle main body 2311 and the driving wheel 2312 are coaxially arranged, that is, the circle center of the first baffle main body 2311 and the circle center of the driving wheel 2312 are superposed.

The first baffle main body 2311 has a circular sheet-shaped structure. The first baffle main body 2311 is connected with one end of the roller main body 21.

The center of the first baffle main body 2311 has a central hoe 2313 and limiting slots 2314. The central hole 2313 is arranged at the center of the first baffle main body 2311. There are multiple limiting slots 2314. The multiple limiting slots 2314 are strip-shaped and are distributed around the center of the first baffle main body 2311. The multiple limiting slots 2314 extend in the radial direction of the first baffle main body 2311. The multiple limiting slots 2314 are in one-to-one correspondence with the multiple comb assemblies 22. Specifically, the limiting slot 2314 matches with the comb limiting parts 2213 of the corresponding comb assembly 22. The limiting slot 2314 can limit the corresponding comb limiting parts 2213 to do reciprocating movement in the extension direction of the limiting slot 2314.

The driving wheel 2312 is arranged at the center of the first baffle main body 2311. The driving wheel 2312 and the first baffle main body 2311 are coaxially arranged. The center of the driving Wheel 2312 also has a central bole 2313. In other words, the central hole 2313 simultaneously penetrates through the driving wheel 2312 and the first baffle main body 2311. In the embodiment, the driving wheel 2312 and the first baffle main body 2311 have integrated structures. The driving wheel 2312 is connected with the power module 50 through a driving belt. Correspondingly, multiple teeth matching with the driving belt are distributed on the surface of the driving wheel 2312. The driving wheel 2312 is driven by the power module 50 to move so as to drive the Whole roller 20 to rotate.

The second baffle 232 is connected with the other end of the roller main body 21. In the embodiment, the second baffle 232 and the first baffle 231 basically have the same structure, which is not described herein.

The eccentric wheel unit 24 comprises a first eccentric wheel 241 and a second eccentric wheel 242. The first eccentric wheel 241 and a second eccentric wheel 242 are respectively connected with the first baffle 231 and the second baffle 232. When the electric pet hair brush 100 is regularly working, the eccentric wheel unit 24 is static corresponding to the shell 10.

The first eccentric wheel 241 comprises an eccentric wheel 2411, an eccentric wheel fixing part 2412 and an eccentric wheel connection part 2413. Two ends of the eccentric wheel connection part 2413 are respectively connected with the eccentric wheel 2411 and the eccentric wheel fixing part 2412. Certainly, when the electric pet hair brush 100 is regularly working, the first eccentric wheel 241 is static corresponding to the shell 10.

The eccentric wheel 2411 is connected with the eccentric wheel connection part 2413. At regular assembly state, the position of the eccentric wheel 2411 corresponding to the shell 10 is constant. The eccentric wheel 2411 is located in the accommodation space formed by the roller main body 21 and the baffle unit 23. Besides, the eccentric wheel 2411 abuts against the bottom ends of the multiple comb assemblies 22. A position of the eccentric wheel 2411 deviating from the center of the central hole 2313 can be adjusted according to the actual requirements. In the embodiment, the teeth 2212 of the comb assembly 22 abutting against the furthest end of the eccentric wheel 2411 deviating from the center may extend from the accommodation space formed by the roller main body 21 and the baffle unit 23 through the corresponding through holes 211. The top ends of the teeth 2212 of the comb assembly 22 abutting against the closest end of the eccentric wheel 2411 deviating from the center are clamped in the corresponding through holes 211. At this time, the top ends of the teeth 2212 are level with the outer surface of the roller main body 21, and the whole comb assembly 22 is accommodated in the roller main body 21. The other comb assemblies 22 abut against the other portions of the eccentric wheel unit 24. The further the abutting portion from the center is, the longer the distance of the top end of each tooth 22 extending from the roller main body 21 is.

The eccentric wheel fixing part 2412 is connected with one end of the front cover plate 13. The eccentric wheel fixing part 2412 and the front cover plate 13 have relatively fixed positions such that the roller 20 is fixed the accommodation space 14 and can rotate in the accommodation space 14.

Two ends of the eccentric wheel connection part 2413 are respectively connected with the eccentric wheel 241 and the eccentric wheel fixing part 2412. Specifically, the eccentric wheel connection part 2413 passes through the first baffle main body 2311 and the driving wheel 2312 and is clamped in the central hole 2313. The eccentric wheel connection part 2413 has a columnar structure, and its outer diameter matches with the aperture of the central hole 2313. That is, the eccentric wheel connection part 2413 can be exactly clamped in the central hole 2313.

The second eccentric wheel 242 and the first eccentric wheel 241 basically have the same structure, which is not described herein. Similarly, when the electric pet hair brush 100 is regularly working, the second eccentric wheel 242 is static corresponding to the shell 10. The second eccentric wheel 242 is arranged corresponding to the first eccentric wheel 241. In other words, a straight line, where the second eccentric wheel 242 and the first eccentric wheel 241 are located, is parallel with the axial direction of the roller 20. The first eccentric wheel 241 and the second eccentric wheel 242 abut against two ends of the multiple comb assemblies 22 at the same time so as to cooperate to achieve that the top ends of the multiple comb assemblies 22 extend from the roller main body 21 or retract into the accommodation space of the roller main body 21. For brevity, details are not repeated herein again.

The air duct 30 is accommodated in the accommodation space of the shell 10. The whole air duct 30 is hollow, and its shape matches with the internal space of the shell 10. Specifically, the air duct 30 is partially accommodated in the accommodation space 14 and is partially accommodated in the handle 16. The front section of the air duct 30 is connected near the roller 20 so as to be capable of collecting the hairs of a pet on the roller 20. The other end of the air duct 30 is connected with the vacuum cleaner (which is not shown in the drawings). The vacuum cleaner is used for sucking the hairs of the pet to collect them.

Figure 9:
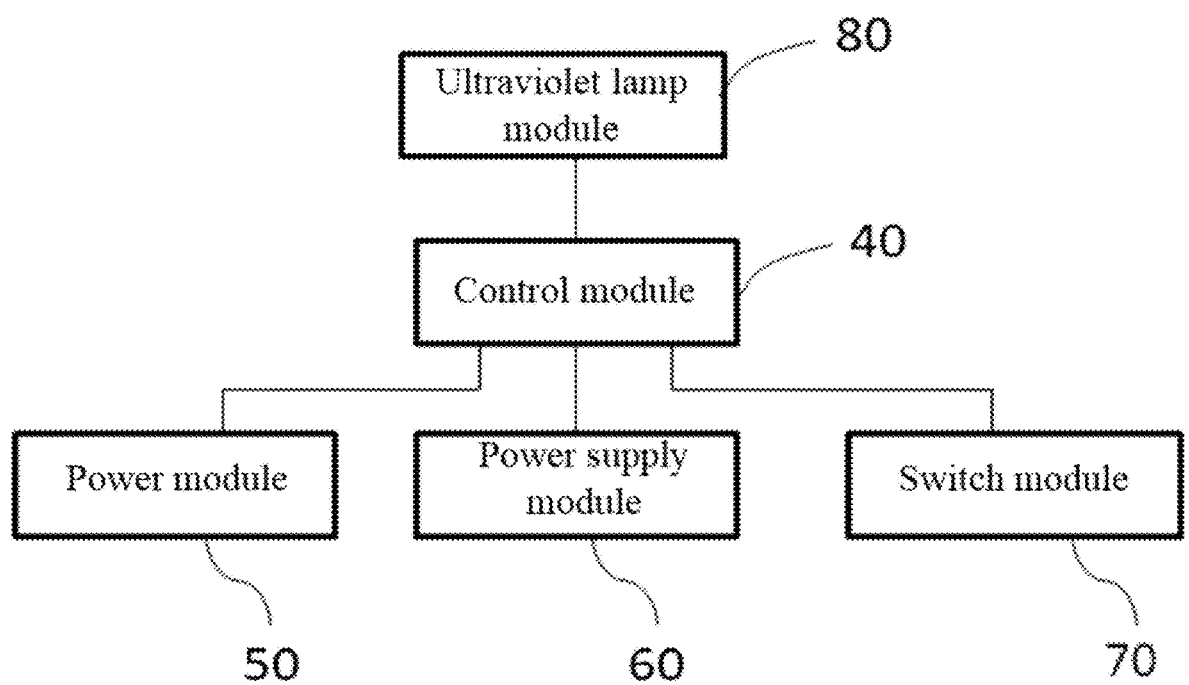
FIG. 9 is a schematic diagram showing an electric connection structure of the electric pet hair brush shown in FIG. 1.

Referring to FIG. 9 again, the control module 40 is respectively electrically connected with the power module 50, the power supply module 60, the switch module 70, the ultraviolet lamp module 80 and the vacuum cleaner at the same time. The control module 40 can control the working state of the electric pet hair brush 100 according to the received information.

The power module 50 is electrically connected with the control module 40 and is connected with the driving wheel 2312 through the driving belt. The working state of the power module 50 is controlled by the control module 40.

The power supply module 60 is arranged in the accommodation space 14. The power supply module 60 is electrically connected with the control module 40 and can provide power for electrical units of the electric pet hair brush 100. In the embodiment, the power supply module 60 is a lithium ion battery.

The switch module 70 is arranged on an upper surface of the handle 16. The switch module 70 is electrically connected with the control module 40. The switch module 70 can not only control the electric pet hair brush 100 to open or close, but also the working state and the strength of the electric pet hair brush 100.

The ultraviolet lamp module 80 is arranged on the bottom surface of the accommodation space 14. The ultraviolet lamp module 80 is electrically connected with the control module 40. The ultraviolet lamp module 80 can sterilize the hairs of the pet during combing so as to kill bacteria attached on the hairs of the pet.

The vacuum cleaner is connected with the air duct 30 through a pipe so as to suck the hairs of the pet. The vacuum cleaner may be the existing general vacuum cleaner, which is not described herein. In the embodiment, the air duct 30 can match with multiple connectors so that the user can conveniently connect different specifications of the vacuum cleaners with it.

To more clearly understand the working process of the electric pet hair brush 100, the following specifically describes it.

When the electric pet hair brush is used for brushing the hairs of the pet, firstly the switch module 70 is turned on to open the electric pet hair brush 100. The control module 40 controls the power module 50 to start so as to drive the roller main body 21 to rotate. The roller main body 21 rotates to drive the roller housing to rotate. The roller housing drives the multiple comb assemblies 22 to move. The multiple comb assemblies 22 rotate around the eccentric wheel unit 24 during movement.

It should be understood that the length of each tooth 2212 of the comb assembly 22 extending from the through hole 211 is the largest when the comb assembly 22 abuts against the furthest portion of the eccentric wheel 24 deviating from the center. In other words, during regular use, the multiple comb assemblies 22 of the electric pet hair brush 100 in contact with the pet abut against the furthest portion of the eccentric wheel unit 24 from the center. When the roller main body 21 continuously rotates, the multiple comb assemblies 22 may slowly retract into the accommodation space of the roller main body 21 while the positions of the multiple comb assemblies abutting against the eccentric wheel 24 are closer and closer to the center. The hairs brought into the accommodated space 14 by the comb assemblies 22 may be sucked into a special storage device through the air duct 30. Repeating in this way, the hairs of the pet are completely combed.

During combing of the hairs of the pet, the ultraviolet lamp module 80 can simultaneously sterilize the hairs of the pet, thereby ensuring the health of the pet.

The electric pet hair brush 100 provided by the present invention can comb the hairs of the pet in an electric roller manner. Moreover, the electric pet hair brush 100 can collect the removed hairs of the pet during rotation, thereby reducing the workload of the pet host. Additionally, the electric pet hair brush 100 provided by the present invention can further sterilize the pet hairs by using the ultraviolet lamp during hair combing so as to ensure the health of the pet.

The specific embodiments of the present invention help a person skilled in the art to understand or achieve the present invention. Various modifications to these embodiments are readily apparent to a person skilled in the art, and the generic principles defined herein may be practiced in other embodiments without departing from the spirit or scope of the present invention. Thus, the present invention is not limited to the embodiments shown herein but falls within the widest scope consistent with the principles and novel features disclosed herein.

What is claimed is:

1. An electric pet hair brush, comprising a shell, a roller, a control module and a power module, wherein the shell has an accommodation space; the control module and the power module are electrically connected and are accommodated in the accommodation space; the roller is arranged at the front end of the shell and is connected with the power module; the roller can be driven by the power module to rotate; the roller comprises a roller main body and multiple comb assemblies; the power module drives the roller main body to rotate, and the multiple comb assemblies can alternatively and circularly extend from the roller main body or retract into an accommodation space of the roller main body with the rotation of the roller main body.

2. The electric pet hair brush according to claim 1, wherein the roller main body has multiple comb through holes; the multiple comb through holes are respectively in one-to-one correspondence with the multiple comb assemblies; teeth of the multiple comb assemblies can extend from the roller main body through the corresponding comb through holes; the teeth of the multiple comb assemblies can also retract into the accommodation space of the roller main body along the corresponding comb through holes.

3. The electric pet hair brush according to claim 2, wherein the roller further comprises a baffle unit; the baffle unit comprises a first baffle and a second baffle; the first baffle and the second baffle are respectively arranged at two ends of the roller main body and are connected with the roller main body to form the accommodation space of the roller main body; the baffle unit and the roller main body are assembled to form a housing of the roller.

4. The electric pet hair brush according to claim 3, wherein the first baffle comprises a first baffle main body and a driving wheel; the first baffle main body and the driving wheel are fixedly connected and are coaxially arranged; the power module is connected with the driving wheel through a driving belt to drive the housing of the roller to rotate.

5. The electric pet hair brush according to claim 4, further comprising an ultraviolet lamp module, wherein the ultraviolet lamp module is electrically connected with the control module and is arranged at the bottom of the shell.

6. The electric pet hair brush according to claim 2, further comprising an ultraviolet lamp module, wherein the ultraviolet lamp module is electrically connected with the control module and is arranged at the bottom of the shell.

7. The electric pet hair brush according to claim 3, wherein the comb assembly comprises a comb main body and a reset spring; the comb main body comprises a comb body, multiple teeth arranged on the comb body and comb limiting parts arranged at two ends of the comb body; the reset springs sleeve the middle portions of the multiple teeth; when the teeth pass through the corresponding comb through holes, the reset springs abut against an inner surface of the roller main body and are compressed so as to be capable of providing a pushing force to reset the comb main body.

8. The electric pet hair brush according to claim 7, wherein each of the first baffle and the second baffle has a central hole and limiting slots; the multiple limiting slots are distributed around the central hole and extend in a radial direction of the first baffle and the second baffle; the multiple limiting slots correspond to the comb main bodies; the comb limiting parts at the two ends of the comb body are respectively arranged in the limiting slots of the first baffle and the second baffle; the comb main body can do reciprocating movement in extension directions of the limiting slots.

9. The electric pet hair brush according to claim 8, further comprising, an ultraviolet lamp module, wherein the ultraviolet lamp module is electrically connected with the control module and is arranged at the bottom of the shell.

10. The electric pet hair brush according to claim 7, further comprising an eccentric wheel unit, wherein the eccentric wheel unit comprises a first eccentric wheel and a second eccentric wheel; one end of the first eccentric Wheel and one end of the second eccentric wheel are respectively connected with the central hole of the first baffle and the central hole of the second baffle; the other ends are connected with the shell; an eccentric wheel of the first eccentric wheel and an eccentric Wheel of the second eccentric wheel are arranged in the accommodation space formed by the roller main body and the baffle unit, are oppositely arranged and deviate from the circle centers of the central holes; the eccentric wheel of the first eccentric wheel and the eccentric wheel of the second eccentric wheel are static corresponding to the shell.

11. The electric pet hair brush according to claim 10, further comprising an ultraviolet lamp module, wherein the ultraviolet lamp module is electrically connected with the control module and is arranged at the bottom of the shell.

12. The electric pet hair brush according to claim 7, further comprising an ultraviolet lamp module, wherein the ultraviolet lamp module is electrically connected with the control module and is arranged at the bottom of the shell.

13. The electric pet hair brush according to claim 3, further comprising an ultraviolet lamp module, wherein the ultraviolet lamp module is electrically connected with the control module and is arranged at the bottom of the shell.

14. The electric pet hair brush according to claim 1, further comprising an air duct and a vacuum cleaner, wherein the air duct is accommodated in the shell; one end of the air duct is close to the roller, and the other end thereof is communicated with the vacuum cleaner.

15. The electric pet hair brush according to claim 14, further comprising an ultraviolet lamp module, wherein the ultraviolet lamp module is electrically connected with the control module and is arranged at the bottom of the shell.

16. The electric pet hair brush according to claim 1, further comprising a power supply module, wherein the power supply module is electrically connected with the control module.

17. The electric pet hair brush according to claim 16, further comprising an ultraviolet lamp module, wherein the ultraviolet lamp module is electrically connected with the control module and is arranged at the bottom of the shell.

18. The electric pet hair brush according to claim 1, further comprising an ultraviolet lamp module, wherein the ultraviolet lamp module is electrically connected with the control module and is arranged at the bottom of the shell.

* * * * *